United States Patent [19]

Augustin

[11] Patent Number: 5,397,461
[45] Date of Patent: Mar. 14, 1995

[54] WATER TREATMENT SYSTEM

[75] Inventor: Mark L. Augustin, Elkhorn, Wis.

[73] Assignee: Pillar Corporation, Milwaukee, Wis.

[21] Appl. No.: 209,943

[22] Filed: Mar. 11, 1994

[51] Int. Cl.6 .............................................. C02F 1/78
[52] U.S. Cl. .................................. 210/123; 210/188; 210/192; 137/202; 137/430
[58] Field of Search ............... 210/123, 124, 188, 192, 210/760; 137/430, 433, 202, 416; 422/186.07, 186.09

[56] References Cited

U.S. PATENT DOCUMENTS

| | | | |
|---|---|---|---|
| 1,116,931 | 11/1914 | Schutt | 137/202 |
| 1,825,776 | 10/1931 | Brubaker | 137/202 |
| 2,111,473 | 3/1938 | Hudson | 137/202 |
| 3,823,728 | 7/1974 | Burris | 210/760 |
| 3,834,415 | 9/1974 | Herron | 137/202 |
| 4,011,884 | 3/1977 | Drori | 137/202 |
| 4,163,456 | 8/1979 | Herron | 137/433 |
| 4,243,066 | 1/1981 | Lambie | 137/430 |
| 4,427,426 | 1/1984 | Johnson et al. | 210/192 |
| 4,966,692 | 10/1990 | Overy | 210/123 |
| 5,213,773 | 5/1993 | Burris | 210/138 |

*Primary Examiner*—Cynthia L. Nessler
*Attorney, Agent, or Firm*—Whyte Hirschboeck Dudek

[57] ABSTRACT

Water treatment system includes means for mixing ozone generated by the system with untreated water. The ozone and water mixture is delivered to a contact chamber at a pre-selected rate. As the mixture of ozone and water is delivered, ozone and other gases are released from the water into the chamber. Gas accumulates at the upper end of the chamber, forcing the water level down and increasing the pressure in the chamber. A float assembly is normally in a closed position due to the buoyancy of the float assembly and the level of the water. As the water level decreases with the accumulation of gases, the float assembly is held in place by the pressurized gas surrounding the float assembly. Finally, the weight of the float assembly overcomes the float's buoyancy and the gas pressure holding the fluid assembly in place. The float assembly then drops, opening the upper end of the chamber to atmosphere. Gases which have accumulated and stratified at the upper end of the chamber are released to atmosphere. Moreover, saturated gases held in the water are immediately released due to the sudden depressurization of the chamber in the water and are also released to atmosphere.

1 Claim, 6 Drawing Sheets

5,397,461

WATER TREATMENT SYSTEM

Cross-references to related applications, if any: None.

Statement as to rights to inventions made under federally-sponsored research and development, if any: None.

BACKGROUND OF THE INVENTION

1. Field of the Invention

The present invention relates generally to a system for removing undesirable constituents from water during treatment in a residential setting. More specifically, the present invention relates to a system for removing these constituents by accumulating the gases in a stratified manner to permit selective removal from the water being treated.

2. Description of Related Art

Earlier systems for removing undesirable constituents from water during treatment usually have included expensive systems for releasing gases from the water. Many of these systems suffer from the problem that the water being treated typically splashes onto or into valving through which the gases are to escape. This frequently results in clogging of the valving mechanism or thereby restricting the travel of escaping gases.

In addition, earlier systems require repressurization of the plumbing system periodically subsequent to depressurization to remove dissolved gases. Finally, many of these earlier systems are difficult to clean since the mechanisms used are intricate and difficult to disassemble and reassemble.

A water treatment unit for removing undesirable constituents of water which permits cleaner operation, is more readily serviceable and overcomes the shortcomings of earlier systems would represent a significant advancement in the art.

OBJECTS AND SUMMARY OF THE INVENTION

It is an object of the present invention to provide a water treatment system for removing undesirable constituents from water which reduces plugging of the venting device.

It is a different object of the present invention to provide a water treatment system for removing undesirable constituents of water which produces a stratification of the accumulating removed gases to facilitate removal of the undesirable constituents.

It is still another object of the present invention to provide a water treatment system for removing undesirable constituents of water which can be adapted for use in a residential setting.

It is still a different object of the present invention to provide a water treatment system for removal of undesirable constituents from water which is inexpensive to construct, operate and maintain.

How these and other objects of the present invention are accomplished will be explained in the detailed description of the preferred and alternate embodiments of the invention in connection with the FIGURES. Generally, however, the objects of the invention are accomplished in a water treatment system which includes means for mixing ozone generated by the system with untreated water. The ozone and water mixture is delivered to a contact chamber at a preselected rate. As the mixture of ozone and water is delivered, ozone and other gases are released from the water into the chamber. These gases accumulate at the upper end of the chamber, forcing the water level down and increasing the pressure in the chamber. A float assembly in the chamber is normally in a closed position due to the buoyancy of the float assembly and the level of the water. As the water level decreases with the accumulation of gases, the float assembly is held in place by the pressurized gas surrounding the float assembly. Finally, the weight of the float assembly overcomes the buoyancy of the float and the gas pressure holding the fluid assembly in place. The float assembly then drops, opening the upper end of the chamber to atmosphere. Gases which have accumulated and stratified at the upper end of the chamber are released to atmosphere. Moreover, saturated gases held in the water are released immediately due to the sudden depressurization of the chamber in the water and are also released to atmosphere.

Other variations, modifications, applications, advantages and ways in which the objects are accomplished will become apparent to those presently of ordinary skill in the art after reviewing the specification and are deemed to fall within the scope of the present invention if they fall within the scope of the claims which follow the description of the preferred and alternate embodiments.

BRIEF DESCRIPTION OF THE DRAWINGS

In the FIGURES, like reference numerals refer to like components.

DESCRIPTION OF THE PREFERRED EMBODIMENT

The present invention may be utilized in the treatment of water for various uses. The preferred embodiment of the present invention is shown in the FIGURES.

Figure 1:
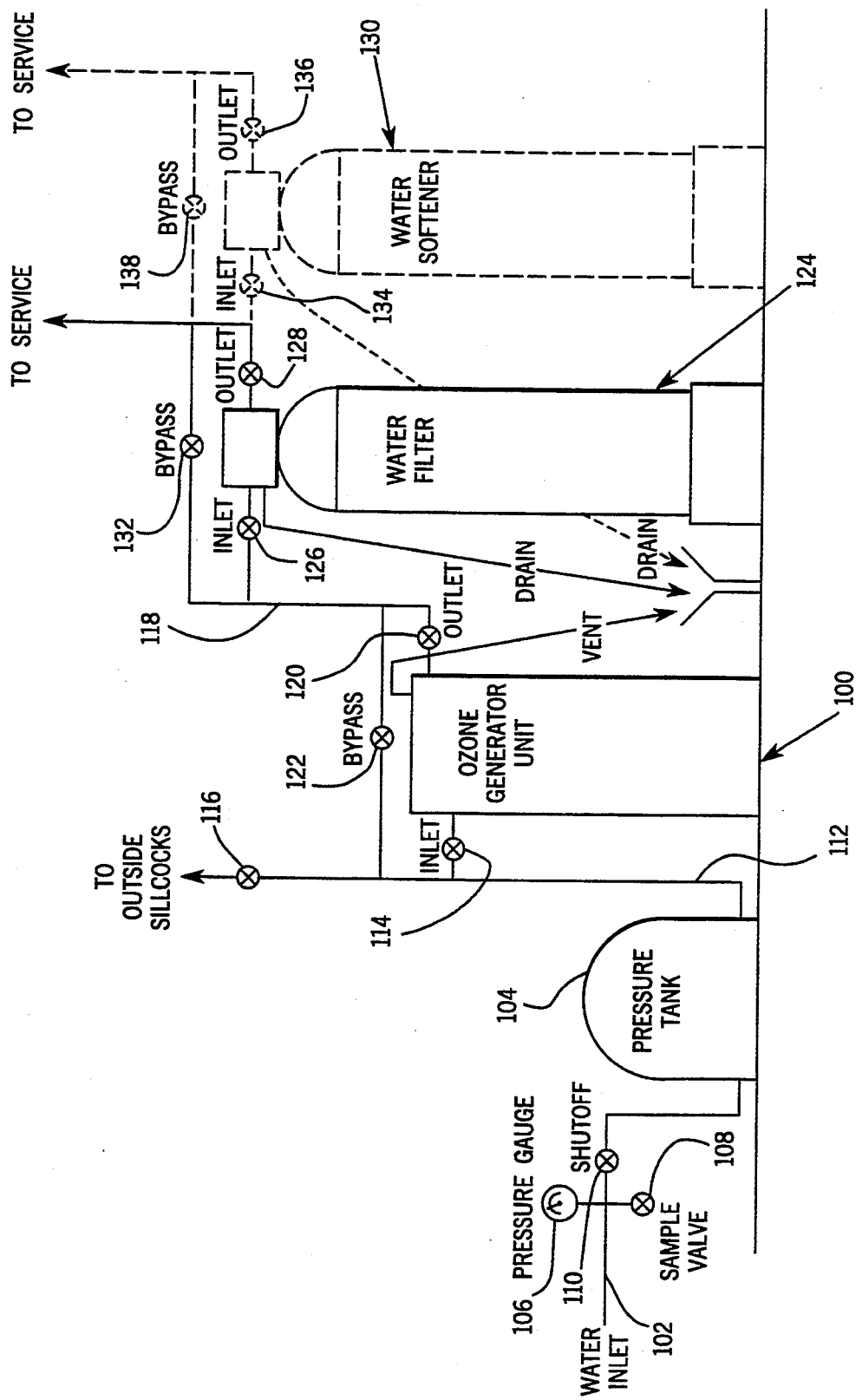
FIG. 1 is a schematic diagram of a total water treatment system incorporating the treatment unit of the present invention.

FIG. 1 shows a system 80 for treating water. The preferred embodiment of the present invention is a treatment unit 100 which can be used in the larger system 80 for treating water. A primary water inlet 102 delivers water to a pressure tank 104. A pressure gauge 106 and a sample valve 108 may be provided intermediate the water source and tank 104. A shut-off valve 110 between gauge 106 and tank 104 is also provided. Water is sent under pressure via piping 112 through an inlet valve 114 to the treatment unit 100 of the present invention. A relief valve 116, permitting release of water to outside sillcocks, is also provided.

After treatment by unit 100 water is transported to the remainder of the system 80 by piping 118 through an outlet valve 120. A bypass valve 122 is also provided for bypassing treatment unit 100. Water treated by unit 100 then moves to a water filter 124 via an inlet valve 126. The filtered water then is delivered through outlet valve 128 either to service or to an optional water softener 130. A bypass valve 132 for the water filter 124 is also provided. Similarly, an inlet valve 134 is provided for water softener 130. Water treated by water softener 130 then exits the water softener 130 via outlet valve 136. Once again, a bypass valve 138 is provided to bypass the water softener. Water is then delivered to service.

Figure 2:
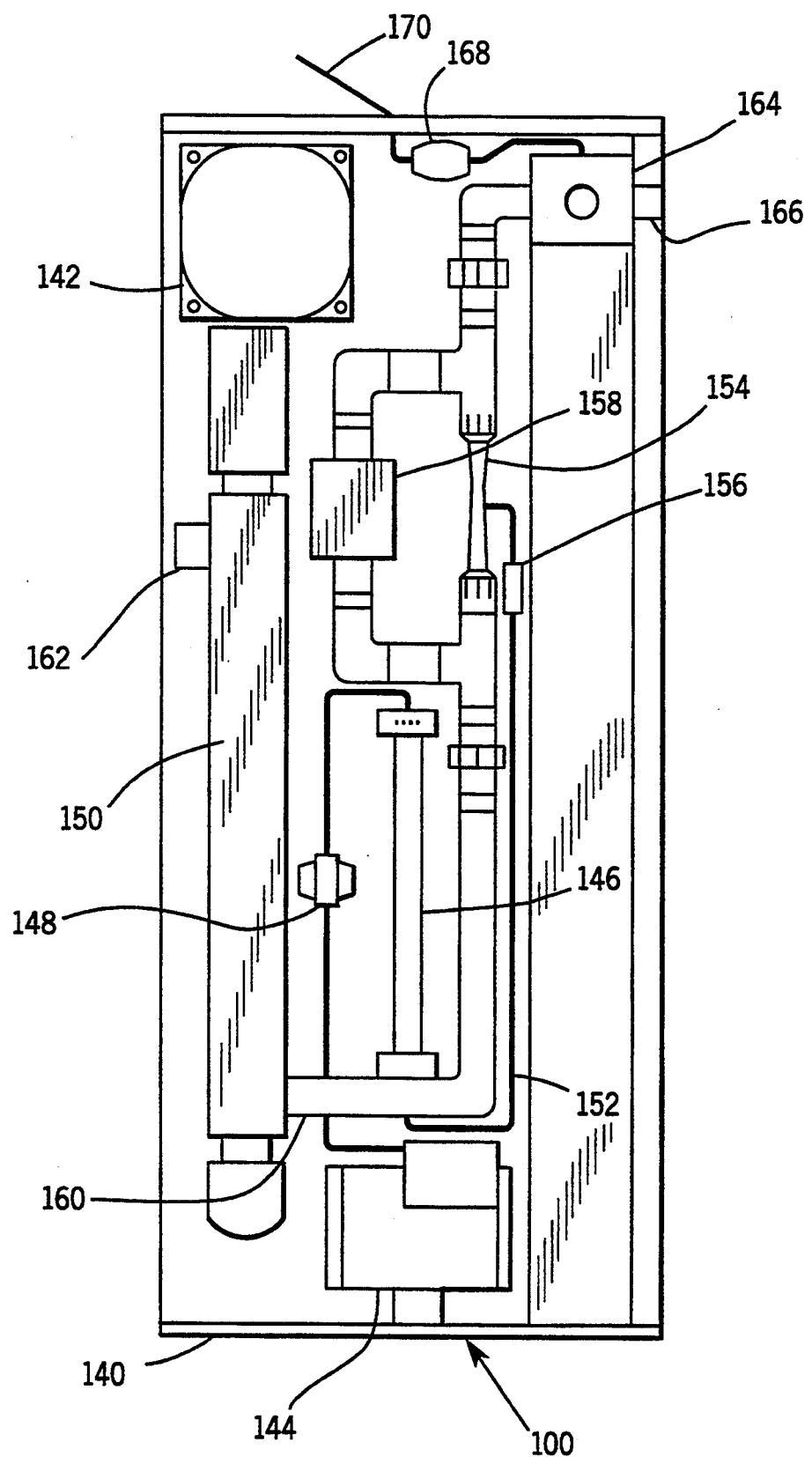
FIG. 2 is a plan view of the preferred embodiment of the present invention.

FIG. 2 shows the general configuration of the preferred embodiment of the present invention. The unit 100 has a frame 140. A transformer 142 provides electricity for operation of unit 100. Air is supplied to the unit 100 by a compressor 144. Air delivered by compressor 144 is sent to an air dryer 146 via a solenoid valve 148. Air from dryer 146 is processed by an ozone generator 150.

Ozone produced by the generator 150 is sent via piping 152 to an ejector unit 154. In the preferred embodiment, the ejector 154 is a Kynar Venturi eductor capable of thoroughly mixing the ozone supplied by generator 150 with water passing through the ejector unit 154. The ozone is delivered to unit 154 via a check valve 156, which prevents backflow of water through the ejector 154 into the ozone system. A back pressure valve 158 is also provided to accommodate water which is not able to pass through the ozone ejector 154. Water is delivered to the ejector 154 and backpressure valve 158 by piping 160 connecting valve 158 to the inlet 162 of unit 100.

Within contact chamber 164, the water is treated in a manner to be described in more detail below. Treated water exits the contact chamber 164 by outlet 166. Constituents which have been removed from the water are released through an ozone destruct device 168 and a gas outlet 170. Ozone destruct devices are well known in the art. In the preferred embodiment, device 168 preferably is a carbon filter for destroying ozone and producing carbon dioxide and oxygen.

Figure 3:
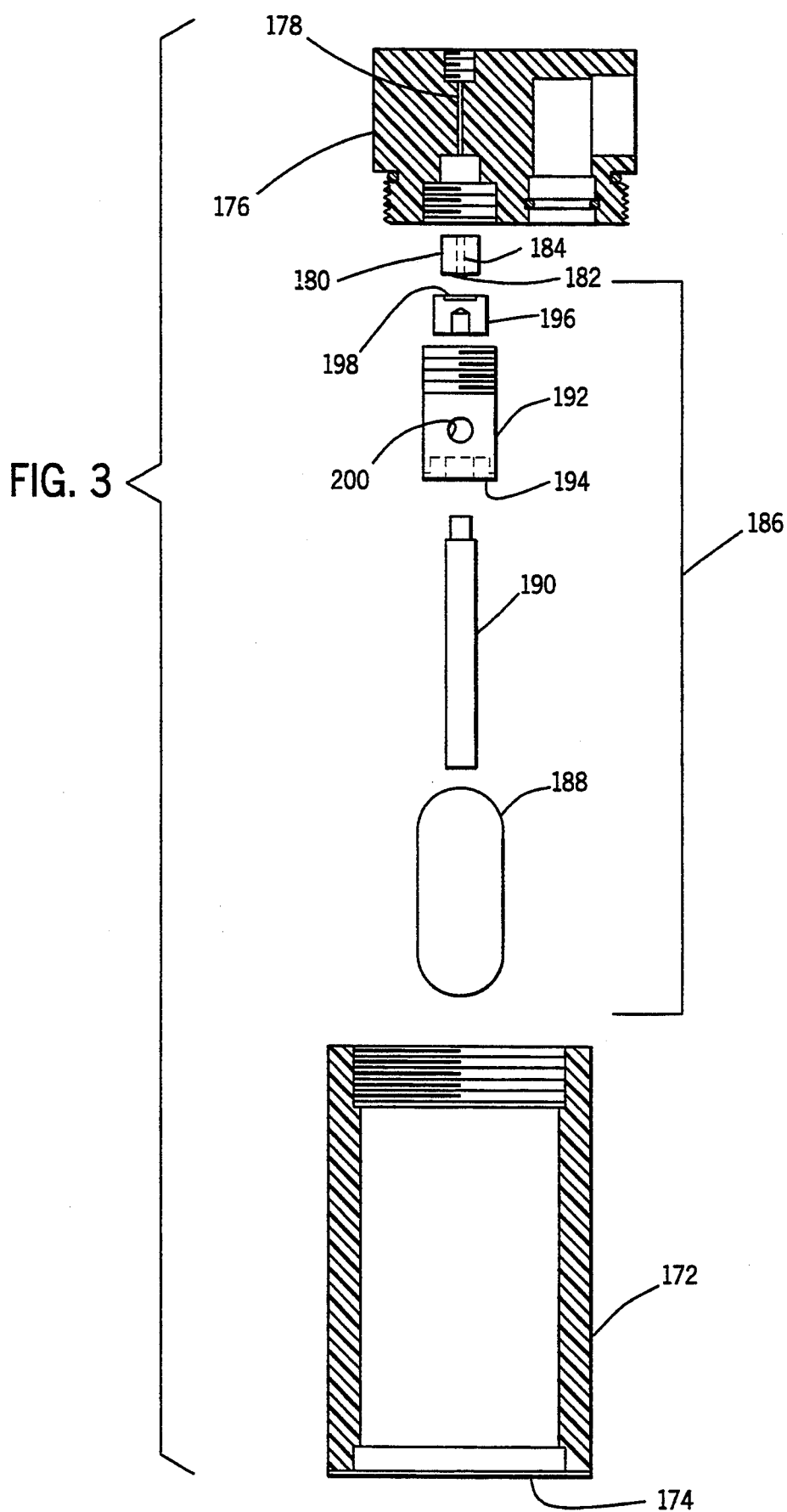
FIG. 3 is an exploded view of the contact chamber of the preferred embodiment of the present invention.

FIG. 3 shows an exploded view of the contact chamber and float assembly of the present invention. The contact chamber 164 is, in the preferred embodiment, a schedule 80, PVC plastic pipe 172 which has a plug 174 in the bottom. Pipe 172 is threaded at the top. A contact chamber head 176 threadably engages the chamber pipe 172. Contact chamber head 176 has a channel 178 which connects the interior of contact chamber 164 with atmosphere, unless channel 178 is blocked. A valve seat 180 is secured by appropriate means, such as gluing, to head 176. Valve seat 180 has a protrusion 182 directed downwardly and surrounding the lower end of an axial channel 184 within seat 180. Channel 184, when valve seat 180 is secured to valve head 176, is a continuation of channel 178.

A float assembly 186 includes a float 188 to which is mounted a rod 190. A bushing 192 threadably engages contact chamber head 176. Rod 190 extends through a plug 194 in the base of bushing 192. Rod 190 is free to move axially through plug 194 and bushing 192. Affixed to the upper end of rod 190 is a valve disc holder 196 to which is attached a rubber valve disc 198. Disc holder 196 is free to move within bushing 192 in a manner to be described in more detail below. Generally, however, movement of disc holder 196 is restricted by bushing 192 so that only a preselected amount of axial movement of rod 190 is possible.

When disc 198 is engaging protrusion 182, the interior of contact chamber 164 is closed and not open to atmosphere. However, when disc 198 is lowered slightly, gases in the upper end of contact chamber 164 are in communication with the atmosphere via a hole 200 in bushing 192, which is connected by a small clearance of air around disc holder 196 and channels 178, 184 to atmosphere.

Figure 4:
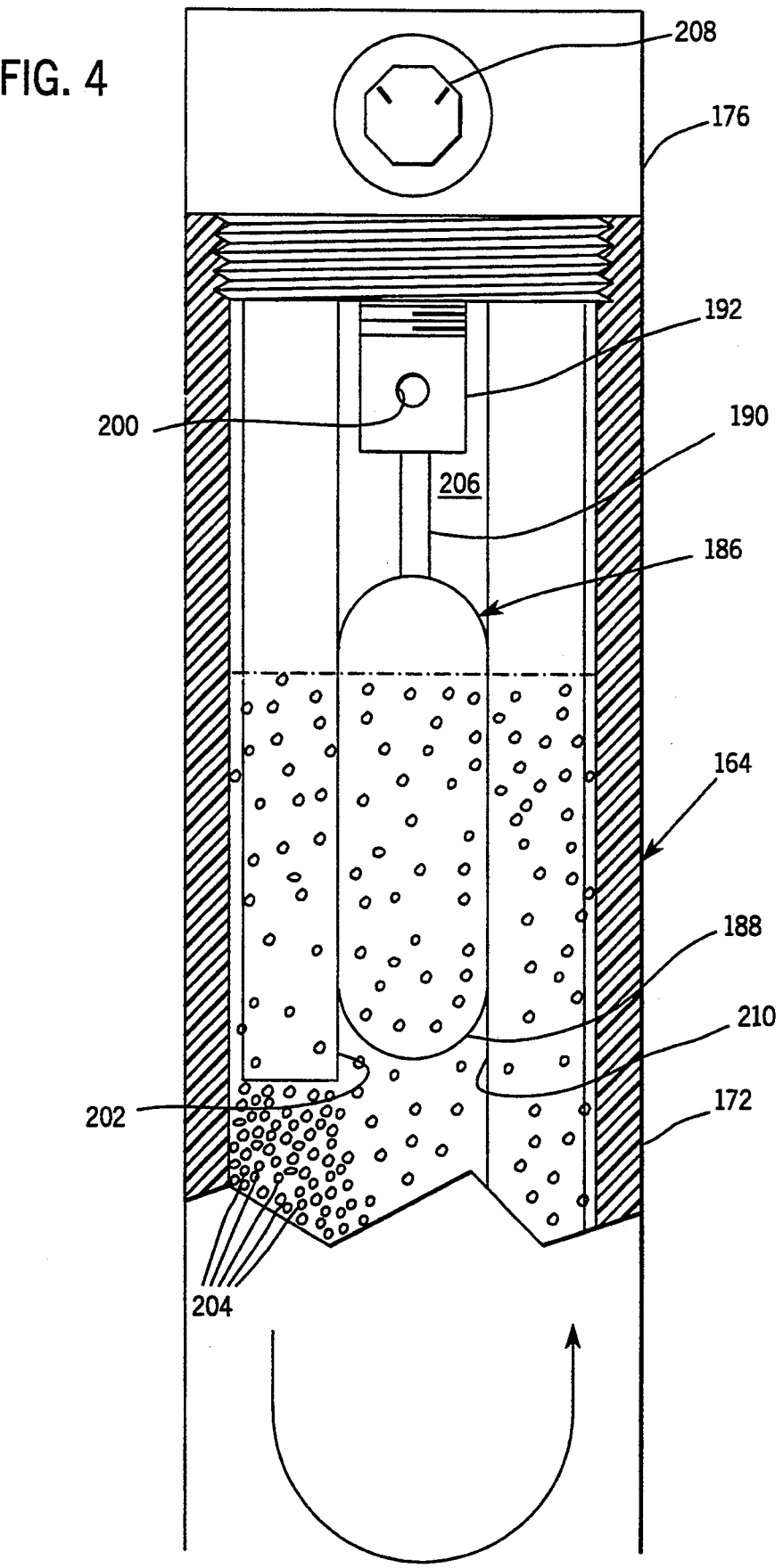
FIG. 4 is a cross-sectional view of the contact chamber of the preferred embodiment of the present invention with the float assembly in a closed position.
Figure 5:
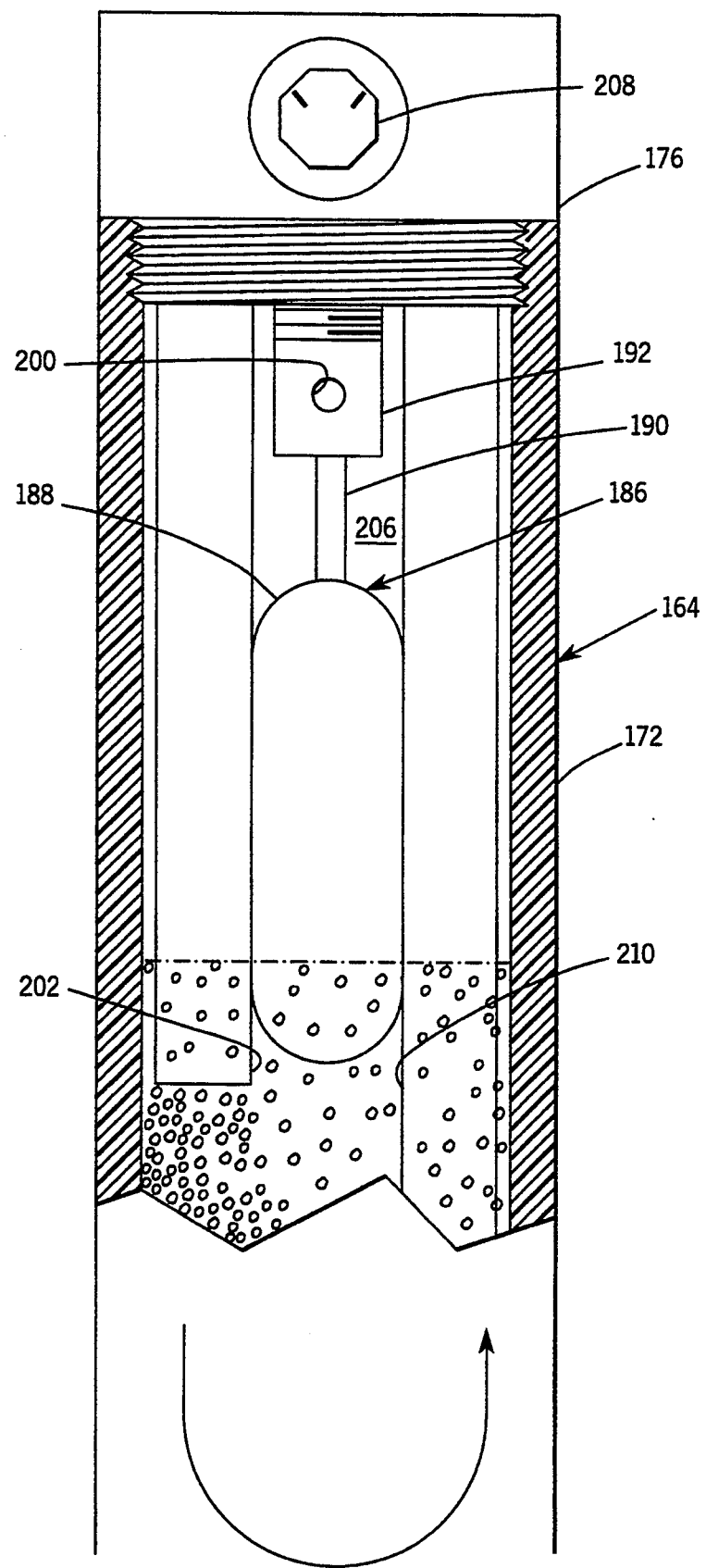
FIG. 5 is a cross-sectional view of the contact chamber of the preferred embodiment of the present invention with the float assembly in a closed position after accumulation and stratification of gases at the top of the contact chamber.
Figure 6:
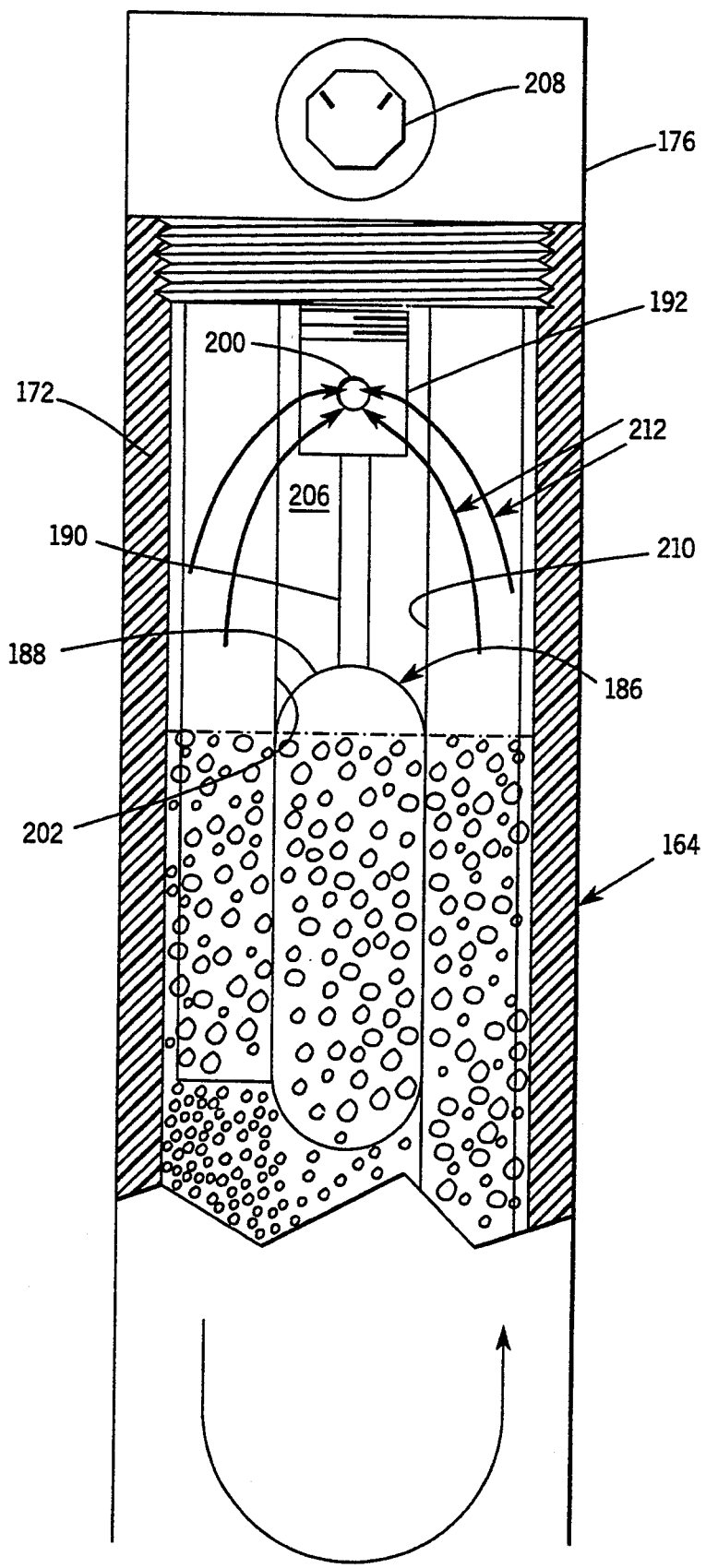
FIG. 6 is a cross-sectional view of the contact chamber of the preferred embodiment of the present invention with the float assembly in an open position releasing gases at the top of the contact chamber.

FIGS. 4–6 show operation of the unit 100. Water entering unit 100 via inlet valve 114 and inlet pipe 162 is delivered to the chamber via an inlet distributor 202 which is also made from PVC plastic. Distributor 202 delivers ozonated water laden with ozone, oxygen and other gas bubbles to the interior of the contact chamber 164 near the top of the chamber. FIG. 4 shows these bubbles entering in a small, compact, dense pattern 204. Water laden with the bubbles is injected downwardly into the water already in the tank. The bubbles reach approximately half the length of the contact chamber tube 172 before beginning an upward rise during which they will collect and become a part of the gaseous pocket 206 on the top of the contact chamber 164. Flow of the water is through a static orifice.

A flow switch 208 measures the flow of water and actuates the ozone generator and compressor at appropriate times in a pre-selected manner. The total surface area of gas to water is maximized by the Venturi eductor 154. The downward direction of the inlet distributor 202 also maximizes the amount of time that the bubbles and water are intermixed, permitting new gases to form or to be introduced by the water. Examples of gases formed and/or introduced during this process include hydrogen sulfide, carbon dioxide, methane and radon. Float assembly 186 is shown in the center of the contact chamber 164 in FIG. 4. A riser tube 210 is positioned to draw water from near the bottom of tube 172 and to deliver that water to the outlet pipe 166. Both the inlet distributor 202 and the outlet riser tube 210 are constructed of schedule 40 PVC material.

As seen in FIG. 5, after a period of time of operation, including the introduction of more water and gas into tube 172, the gas pocket 206 has increased in size. This is due to the rising bubbles. As a result, several changes in the chamber have occurred. The water level has dropped significantly, thus reducing the amount of float 188 which is submerged in the water. The weight and buoyancy of float 188 normally would cause the float to maintain the same level within the water. However, the collection of gases in pocket 206 has created additional pressure, keeping disc 198 in a sealed position relative to valve seat 180. This additional pressure prevents unseating disc 198 until enough of the float has been exposed above the water that the weight of the float finally overcomes the pressurized gases in pocket 206.

Additionally, the gases which have been collecting in pocket 206 have different atomic weights. Therefore, they stratify with the heaviest gas, ozone, settling closest to the water level. This provides a buffer of ozone between the stratified gases in pocket 206 and the water under treatment within tube 172.

Typically, the pressure within pocket 206 is 60 pounds and is adequate to hold the valve disc closed. Once the float has been uncovered sufficiently by the lowering water level, the weight of the float 186 pulls the valve disc 198 out of sealing engagement of valve seat 180. As seen in FIG. 6, unseating disc 198 allows gases under pressure trapped within pocket 206 to escape through hole 200, channel 184 and channel 178 to atmosphere. The gases escape in the direction of arrows 212. As the waste gases and other byproducts are being vented through hole 200, the flow of water and bubbles into the contact chamber greatly increases due to the substantial pressure drop.

A unique phenomenon occurs at this point. With rapid depressurization of the chamber 164, the gas bubbles in the water rapidly expand in size. This increases the surface area of the gas, thus increasing the surface area and the contact between the water and the ozone. Rapid depressurization also allows saturated gases that are dissolved in the water to be liberated and vented. Under a constant 60 pounds pressure, in which a typical contact chamber operates, this phenomenon would not be possible. As the gases are vented out, the water displaces the air volume at the top of the contact chamber. The float assembly 186 quickly rises, pushing the valve disc 198 up against the valve seat 180, thus sealing the chamber again from the atmosphere. At this point, the system begins to repressurize itself. In addition to the gases which have accumulated in pocket 206, saturated gases, those gases dissolved in water and only released through depressurization or heating, are also released. At this point, the system begins to operate again as illustrated in FIG. 4, thereby establishing a periodic operation permitting constant treatment of water passing through the contact chamber 164.

What is claimed is:

1. A water treatment system comprising:
   A) a source of untreated water;
   B) an ozone generator;
   C) means for mixing the ozone produced by said generator with the untreated water; and
   D) a contact chamber means comprising:
      1) an elongated chamber having a top end and a bottom end;
      2) inlet means for delivering at a preselected rate the water and ozone mixture proximate said top end of said chamber;
      3) outlet means for removing water from said chamber proximate said bottom end; and
      4) means for removing gases in the water in said chamber, said removal means comprising:
         a) a buoyant float;
         b) a rod vertically attached to the top of said float;
         c) a valve disc mounted to the distal end of said rod;
         d) a valve seat mounted to said top end of said chamber;
         e) a channel in said valve seat connecting the interior of said chamber to atmosphere; and
         f) a bushing surrounding said disc and a portion of said rod, said bushing providing means for limiting the amount of movement of said disc to a preselected amount.

* * * * *